UNITED STATES PATENT OFFICE.

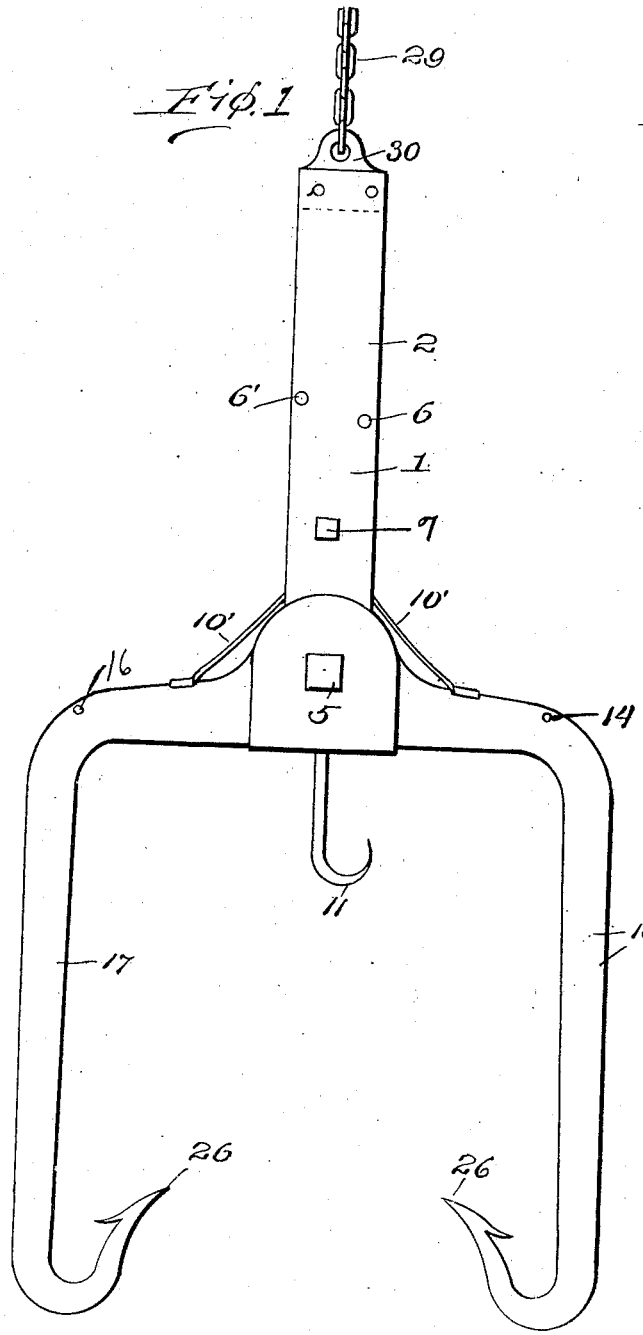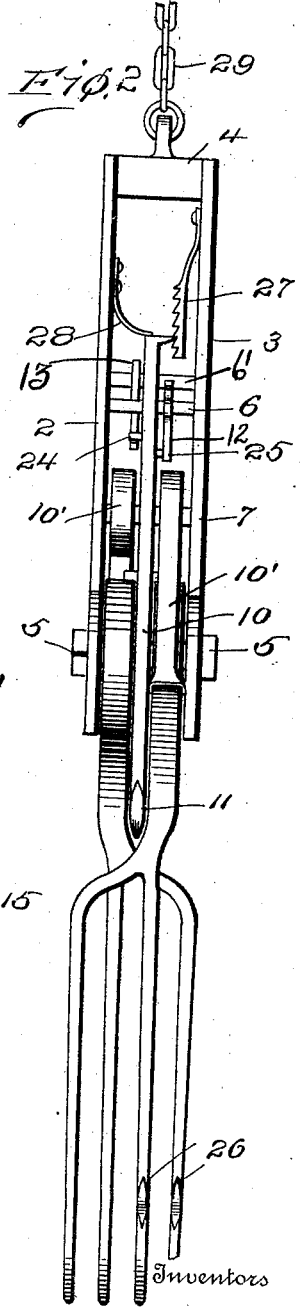

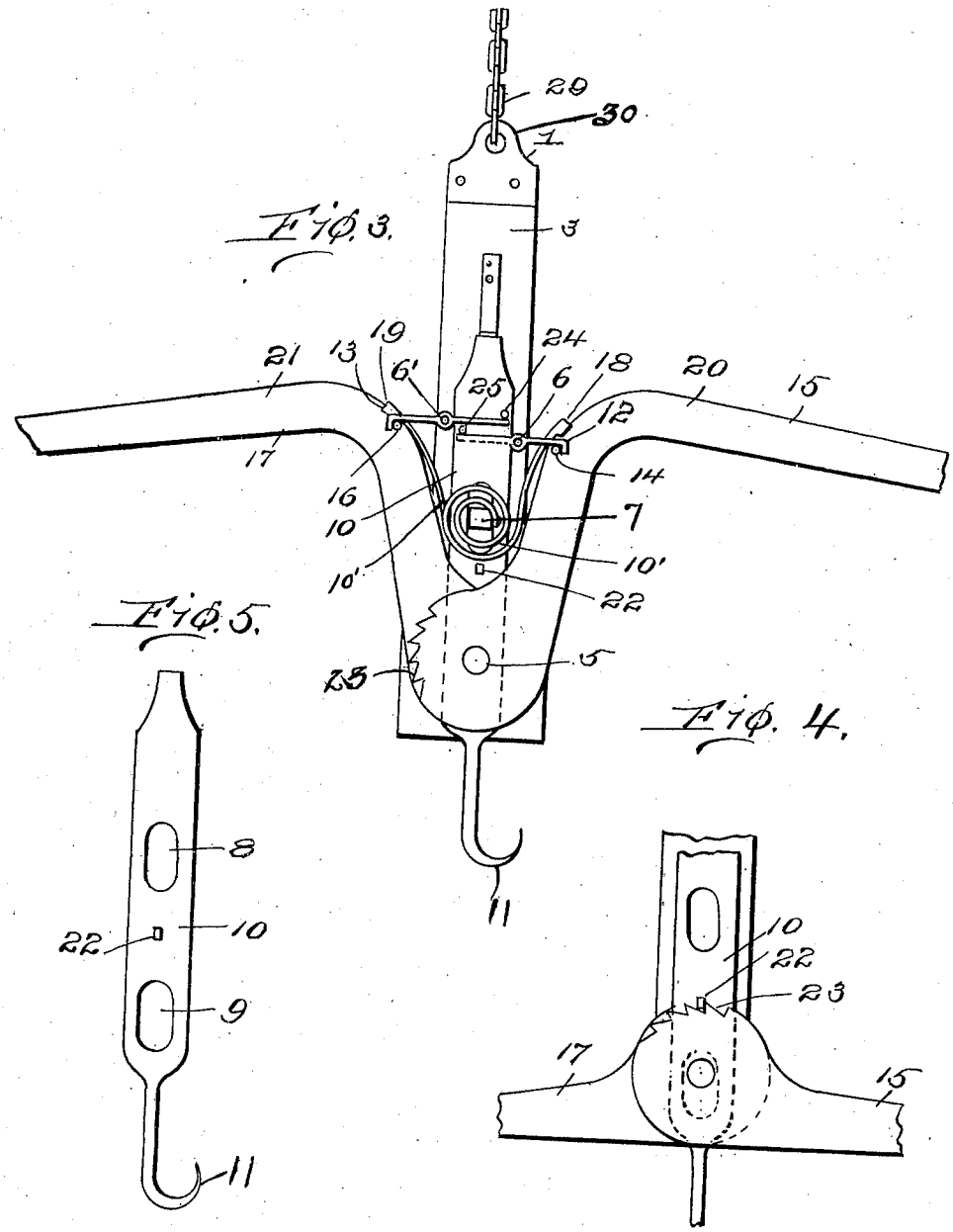

JOHN DRUBKO, OF WILLOW RIVER, MINNESOTA.

ANIMAL-TRAP.

976,789.

Specification of Letters Patent. Patented Nov. 22, 1910.

Application filed March 24, 1910. Serial No. 551,275.

*To all whom it may concern:*

Be it known that I, JOHN DRUBKO, a citizen of the United States, residing at Willow River, in the county of Pine and State of Minnesota, have invented certain new and useful Improvements in Animal-Traps, of which the following is a specification.

My invention has relation to new and useful improvements in animal traps and its main object is to produce a device of this character that will be efficient in operation, durable, simple in construction and inexpensive to manufacture.

With the foregoing and other objects in view my invention consists of the novel construction and arrangement of parts as are fully described in this specification, illustrated in the accompanying drawings forming a part thereof and particularly pointed out in the claims hereunto appended.

Reference being had to the drawings: Figure 1 is a front, elevational, plan view of my improved trap, in sprung position. Fig. 2 is a side, elevational view thereof, in sprung position. Fig. 3 is an elevation of my device, in open or unsprung position, parts thereof being removed to more fully disclose the construction of the elements thereunder. Fig. 4 is a detail of the locking means for the jaws of the trap after the same has been sprung. Fig. 5 is a detail of the means by which the trap is sprung.

Referring more particularly to the drawings, in which like characters designate like parts throughout, my invention, in detail, is described as follows:

The body portion 1 is constructed of two members 2 and 3 held together at their upper ends by a suitable crosspiece 4 and at their lower ends by a nut and bolt connection 5. Extending from one member to the other and held rigidly are the pins 6 and 7, said pin 7 passing through the elongated perforation 8, cut in the slide 10, to which slide is formed integral therewith the bait hook 11. Said bolt 5 passes through the elongated perforation 9, in said slide, said vertically disposed elongated perforations permitting said slide of having vertical movement. Pins extend from one member of the body portion of said trap to the other member thereof, said pins being designated by the numerals 6 and 6'. To each of said pins 6 and 6' are rotatably mounted latches 12 and 13, respectively  Said latch 12 engages a lug 14 formed integral with the jaw 15 of said trap. Said latch 13 engages a lug 16 formed integral with the jaw 17 of the trap. The jaws are each pivotally held to the bolt 5. Helical or coil springs 10' or springs of any suitable construction, have their free ends 18 and 19 pressing against the curved portions 20 and 21, respectively, of said jaws. When the trap is in open or unsprung position the jaws 15 and 17 are held in open position, as stated, by means of their respective latches. When the trap is in closed position the jaws are in that position as illustrated in Fig. 1 and are held in that position by means of a lug 22, formed integral with said slide 10, coming into contact with one of a plurality of teeth 23 cut in each of said jaws. The latches 12 and 13 are held in engagement with their respective lugs 14 and 16 by means of lugs 24 and 25 respectively, and also the tension exerted upon said jaws by means of said coil or helical spring 10'.

My trap is sprung as follows: When the slide 10 is pulled downward said lugs 24 and 25 press against the inner ends of their respective latches causing them to release their respective jaws, when said jaws will immediately close, caused by the action of said spring 10'. Each jaw has formed at its outer end a plurality of inwardly turned hooks 26, which hooks engage the animal which it is desired to catch. Said slide 10 is held normally against upward movement by means of the rack bar 27 and the flat spring 28 each of which are held to one of the members 2 or 3 of said body portion.

The entire trap is suspended from a suitable point by means of a chain 29 secured to the perforated ear 30 of said body portion 1.

Although I have specifically described the construction of my invention yet I may exercise the right to make such changes therein as do not depart from the spirit of my invention and as fall within the scope of the claims hereunto appended.

Having described my invention what I claim as new, is:

1. In an animal trap, the combination of a body portion with a pair of jaws pivotally held thereto, means to secure the jaws in open or unsprung position, comprising latches, resilient means to cause the jaws to close when sprung and means to spring the jaws at the proper time, the last-mentioned means consisting of a slide to which is formed integral therewith a bait hook, said latches normally acting as a connection between the jaws and the body portion when the trap is in unsprung position, said slide having lugs formed thereto which unlatch the latches when the slide and bait hook are drawn downward, said slide so constructed as to slide within the body portion of the device.

2. In an animal trap, the combination of a body portion with a pair of jaws pivotally connected therewith, means to secure the jaws in unsprung position consisting of latches pivotally held to the body portion, said latches engaging lugs formed integral with the jaws, resilient means to cause the jaws to close when sprung and means to spring the jaws comprising a bait hook and a slide, the bait hook formed integral with the slide.

3. In an animal trap, the combination with a body portion of a pair of curved jaws, said body portion comprising two vertical members held in spaced relation to each other by a crosspiece and nut and bolt connection, said jaws each pivoted to said bolt and between the members, means to secure the jaws in open or unsprung position, said means consisting of latches and pins, each latch pivotally mounted upon a respective pin, which pins are interposed between the members, a lug provided upon one face of each jaw and in such position that it will be engaged by its respective latch, resilient means to cause the jaws to close when the latches are released; means comprising a slide to release the latches at the proper time, said slide provided with a pair of lugs, each of which contacts the inner end of and is adapted to trip a respective latch when the slide is drawn downward, said slide adapted to slide between the members of the body portion and means to secure the jaws in locked position when sprung.

4. In an animal trap the combination with a body portion of a pair of jaws, said body portion comprising two vertical members held in spaced relation to each other by a crosspiece and nut and bolt connection, said jaws each pivoted to said bolt and between the members, a plurality of teeth cut in the edge of the jaws at their inner ends, means to secure the jaws in open or unsprung position, and means to secure the jaws in locked position when sprung, the last-named means comprising a slide traveling vertically between the members of the body portion, a lug provided upon one face of the slide and adapted to engage said teeth at the inner ends of the jaws when the slide is drawn downward and the trap is sprung.

In testimony whereof I affix my signature, in presence of two witnesses.

JOHN DRUBKO.

Witnesses:
  A. A. UPGREN,
  F. THILLMANN.